UNITED STATES PATENT OFFICE.

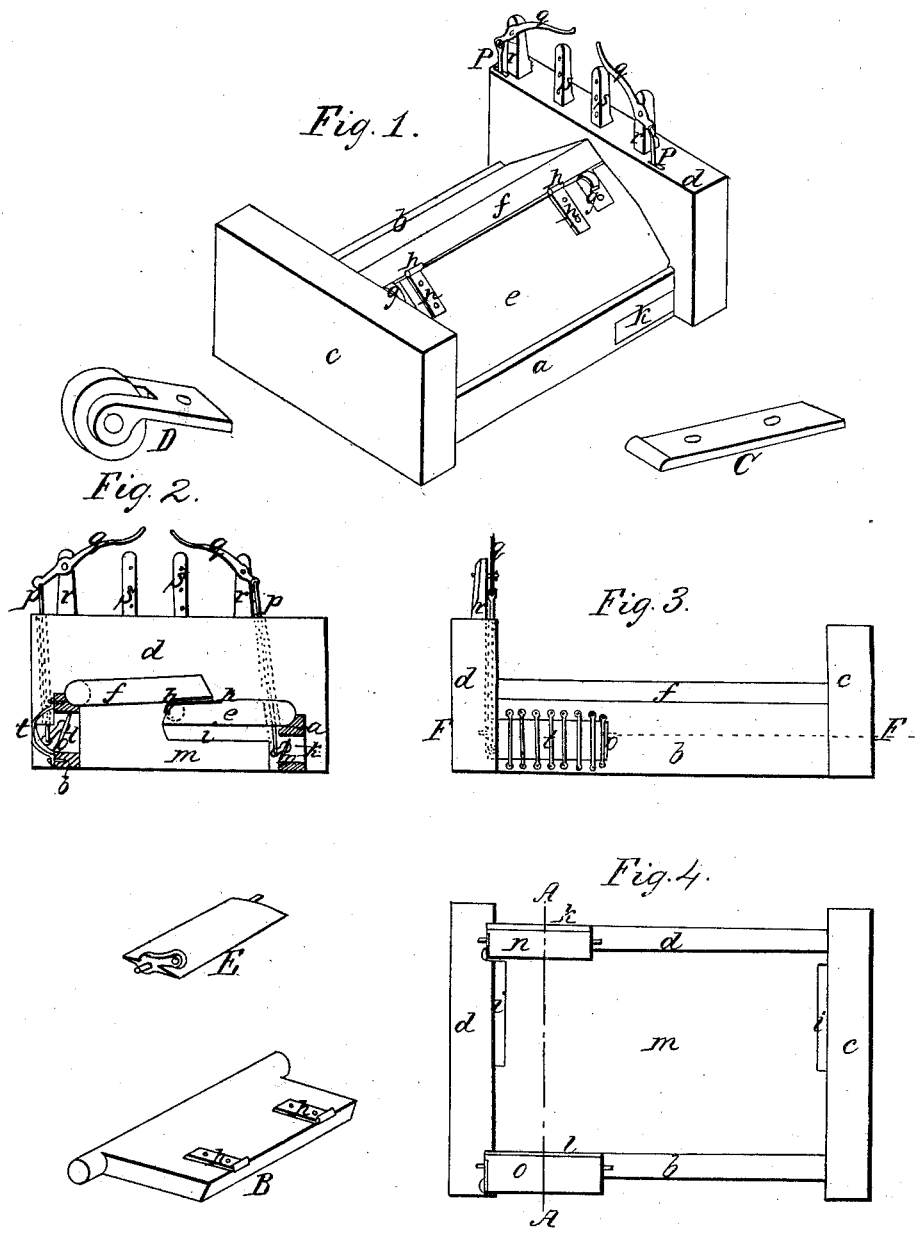

MILOW S. WHEATON, OF RIGA, NEW YORK.

ADJUSTABLE DAM OR WATER-WEIR.

Specification of Letters Patent No. 6,266, dated April 3, 1849.

*To all whom it may concern:*

Be it known that I, MILOW S. WHEATON, of the town of Riga, in the county of Monroe and State of New York, have invented a new and useful machine or structure for the purpose of damming streams and regulating the discharge of surplus water from streams so dammed, and which I denominate a "lock dam"; and I do hereby declare that the following is a full, clear, and exact description of the construction and operation of the same, reference being had to the annexed drawings, making a part of this specification, in which—

Figure 1 is a perspective view of the whole machine with the float gates raised and paddle gates closed. Fig. 2 transverse section at A A on Fig. 1 with the float gates down and paddle gates closed. Fig. 3 rear elevation with float gates down and paddle gate closed. Fig. 4 plan at F, F, Fig. 3. (*a*) front frame; (*b*) rear frame; (*c*, *d*,) abutments; (*e*) front float gate; (*f*) rear float gate; (*g*, *g*) friction rollers; (*h*, *h*, *h*, *h*,) catches; (*i*, *i*,) stops or rests; (*k*, *l*,) openings in frames; (*m*) chamber; (*n*, *o*,) paddle gates; (*p*, *p*,) connecting rods; (*q*, *q*) levers; (*r*, *r*) lever posts; (*s*, *s*) gage posts; (*t*) grating.

The front frame (*a*) and rear frame (*b*) form foundation walls placed transversely to the stream and are bounded on each side by the abutments (*c* and *d*); the upper and inner edges of the frames being made with a concave quarter circle for the outer edges of float gates to work against. The front float gate (*e*) and rear float gate (*f*) are constructed with pivots, as shown in detail drawing B, and have their outer edges formed semi-cylindrically to work in the concavities on frames; the pivots are to be inserted in suitable boxes formed in the abutments. The front gate has a slight bevel worked on the rear half of its upper surface, as shown in Fig. 2.

The friction rollers (*g*, *g*,) see detail drawing D, are to be fixed on the top inner edge of the front float gate, working against the under side of rear float gate. The catches (*h*, *h*, *h*, *h*,) of the form shown in detail drawing C, are to be attached, two on the upper and inner edge of the front float gate, and two on the lower and inner edge of rear float gate. The stops or rests (*i*, *i*,) are affixed on the inner side of the abutments to sustain the front float gate in a horizontal position when down.

In the front frame is to be made an oblong opening (*k*) and a similar one (*l*) of larger dimensions in rear frame allowing communication from the water to the chamber (*m*) of dam; in these openings paddle gates of suitable relative sizes are to be inserted (for their form see detail drawing E). The paddle gates are to be formed with and turn on pivots, placed eccentrically to them which work on bearings at each end of the openings (*k*, *l*) the paddle gate (*n*) to open inward, and gate (*o*) outward, with reference to the chamber. The end of each paddle gate placed next to abutment (*d*) has a crank formed or fixed on it, to which connecting rods (*p*, *p*,) are attached, passing through suitable openings in abutment (*d*) as shown by dotted lines on Fig. 2. The grating (*t*) is to prevent the admission of improper matters into the chamber.

The structure being completed and the paddle gates closed, the water in its usual course passes over the float gates.

When it is desirable to raise the dam, the paddle gate in rear frame is opened and the water admitted into the chamber thereby raising the float gates to the position shown in Fig. 1 where they are retained by the catches hooking on to each other. (N. B. This retention may be secured by affixing stops over the rear gate on the inner sides of the abutments or otherwise.)

When it is desired to let off the surplus water the paddle gate in front wall is opened and the levers being retained by pins inserted in any of the registered holes on the gage posts, regulate the degree of admission and emission so as to keep the dam at any required height. To empty the dam entirely it is only requisite to close the rear paddle gate and open the front one by which the chamber being emptied, the float gates descend and the water resumes its usual course. It is to be observed that the paddle gates, though moving easily, must be opened or closed gradually.

The eccentric position of the pivots on the paddle gates, leaving their lower portion wider than the upper, allows the pressure of the water on them when closed to retain them in their place.

The advantages of my invention are—that by it, the water is made to form its own dam—the ability to regulate the height and discharge of the water to any required degree in the most simple mode,—the facility of its operation and the small amount of power requisite; care only being taken not to raise or depress the levers by sudden application of force—the cheapness and durability of its construction, being constantly under water—and for the same reason, the almost utter impossibility of its being torn up by floods. It is equally applicable as a waste weir.

What I claim as my invention and desire to secure by Letters Patent is—

The combination of the two inclined leaves or float gates, with each other and the paddle gates, the whole arranged as described, between abutments and forming an adjustable dam and waste weir.

MILOW S. WHEATON.

Witnesses:
SAML. BENNETT,
THOMAS CARR.